United States Patent
Mathai et al.

(10) Patent No.: US 6,249,678 B1
(45) Date of Patent: Jun. 19, 2001

(54) COMMUNICATION UNIT AND METHOD FOR PERFORMING NEIGHBOR SITE MEASUREMENTS IN A COMMUNICATION SYSTEM

(75) Inventors: Stinson Mathai, Des Plaines; Mark J. Marsan, Elmhurst, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/390,562

(22) Filed: Sep. 3, 1999

(51) Int. Cl.[7] .................................................. H04Q 7/20
(52) U.S. Cl. ............................................ 455/437; 455/434
(58) Field of Search .................................. 455/436, 437, 455/434, 161.1, 38.3, 515

(56) References Cited

U.S. PATENT DOCUMENTS

| | | | |
|---|---|---|---|
| 5,483,669 | * | 1/1996 | Barnett et al. ..................... 455/437 |
| 5,539,748 | * | 7/1996 | Raith .................................. 370/329 |
| 5,542,098 | * | 7/1996 | Bonta ................................. 455/434 |
| 5,627,882 | * | 5/1997 | Chien et al. ........................ 455/464 |
| 5,794,146 | | 8/1998 | Sevcik et al. ...................... 455/434 |
| 5,857,153 | * | 1/1999 | Lupien ............................... 455/422 |
| 5,970,407 | * | 10/1999 | Brunner et al. .................... 455/437 |

\* cited by examiner

*Primary Examiner*—William Trost
*Assistant Examiner*—Rafael Perez-Gutierrez
(74) *Attorney, Agent, or Firm*—Jeffrey K. Jacobs

(57) ABSTRACT

The present invention provides a method and apparatus for performing neighbor site measurements that address the need to reduce data transfer delays while performing such measurements. In the present invention, the signal quality of the serving site (108) of a communication unit (102) is used to determine the neighbor site measurement characteristics for the communication unit (102). Serving site signal quality is used as an indicator of the critical or non-critical need for neighbor site measurements. Thus, data transfer delays can be reduced by delaying serving site communication only when the serving site signal quality indicates a critical need for neighbor site measurements.

17 Claims, 2 Drawing Sheets

COMMUNICATION UNIT AND METHOD FOR PERFORMING NEIGHBOR SITE MEASUREMENTS IN A COMMUNICATION SYSTEM

FIELD OF THE INVENTION

The present invention relates generally to communication systems and, in particular, to performing neighbor site measurements in communication systems.

BACKGROUND OF THE INVENTION

In many multi-site communication systems today, communication units make neighbor site measurements to select a handoff site. The communication unit relies on a serving site for communication service, but as the communication unit moves through the serving site's wireless coverage area, the quality of the wireless connection with that serving site may deteriorate. To address this problem, the communication unit hands off to a neighboring site, whereby the neighboring site becomes the new serving site of the communication unit.

To select a neighboring site to which to handoff, communication units often will perform neighbor site measurements that involve, for example, determining the signal strength of signals received from neighboring sites. Typically, measurements of neighboring site signals are performed with some regularity. With up-to-date neighbor site measurements, the changing wireless environment can be monitored and a handoff performed before communication service is interrupted.

To perform neighbor site measurements, a communication unit must receive signals from neighboring base sites. For communication units that can receive only one signal at a time, neighbor site measurements must be performed at the expense of receiving signaling from the serving site. During a period of extended data transfer, such a communication device often must delay the data transfer in order to make neighbor site measurements. Thus, data throughput is reduced and quality of service is lowered.

Therefore, a need exists for an apparatus and method for performing neighbor site measurements that reduces such data transfer delays.

DESCRIPTION OF A PREFERRED EMBODIMENT

The present invention provides a method and apparatus for performing neighbor site measurements that address the need to reduce data transfer delays while performing such measurements. In the present invention, the signal quality of the serving site of a communication unit is used to determine the neighbor site measurement characteristics for the communication unit. Serving site signal quality is used as an indicator of the critical or non-critical need for neighbor site measurements. Thus, data transfer delays can be reduced by delaying serving site communication only when the serving site signal quality indicates a critical need for neighbor site measurements.

The present invention encompasses a method for performing neighbor site measurements by a communication unit in a communication system that comprises a serving site and neighbor sites. The serving site provides communication service to the communication unit, and the neighbor sites are sites to which the communication unit may handoff. In this communication system, the communication unit receives a signal from the serving site and measures the signal quality of the signal. The communication unit then determines neighbor site measurement characteristics based on the signal quality of the signal and performs neighbor site measurements according to the neighbor site measurement characteristics determined.

Additionally, the present invention encompasses another method for performing neighbor site measurements by the communication unit in the communication system. The communication unit receives a signal from the serving site and measures the signal quality of the signal. The communication unit then compares a serving site signal quality, based on the signal quality of the signal, to a threshold. When the serving site signal quality is greater than the threshold, the communication unit ceases to perform neighbor site measurements. When the serving site signal quality is not greater than the threshold, the communication unit performs neighbor site measurements.

The present invention also encompasses a communication unit apparatus. The communication unit apparatus comprises a receiver capable of receiving a signal from a serving site and a processor. The processor is capable of measuring a signal quality of the signal, determining neighbor site measurement characteristics based on the signal quality of the signal, and performing neighbor site measurements. The processor uses the receiver to perform neighbor site measurements according to the neighbor site measurement characteristics determined.

Figure 1:
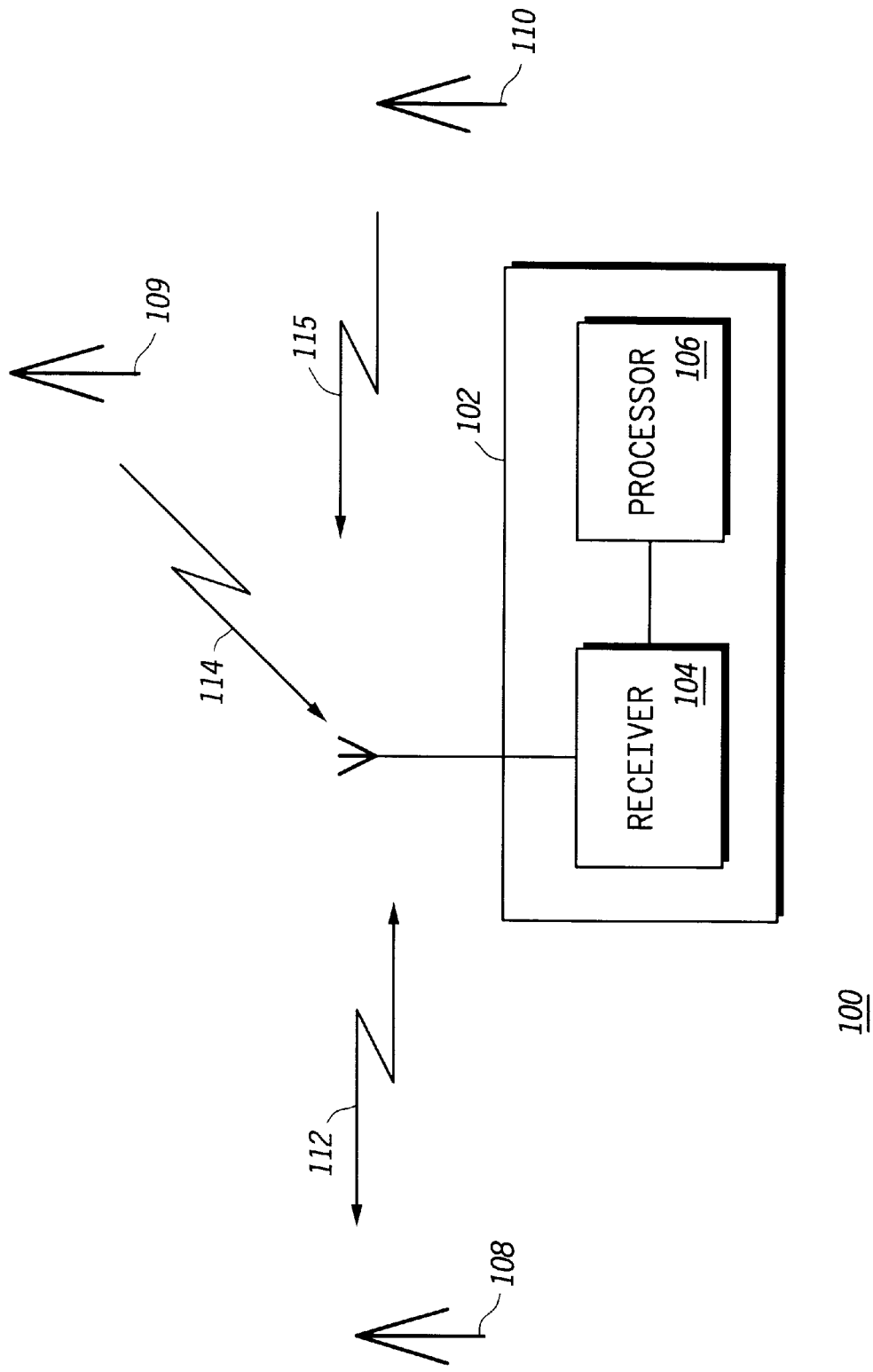
FIG. 1 is a block diagram depiction of a communication system in accordance with a preferred embodiment of the present invention.
Figure 2:
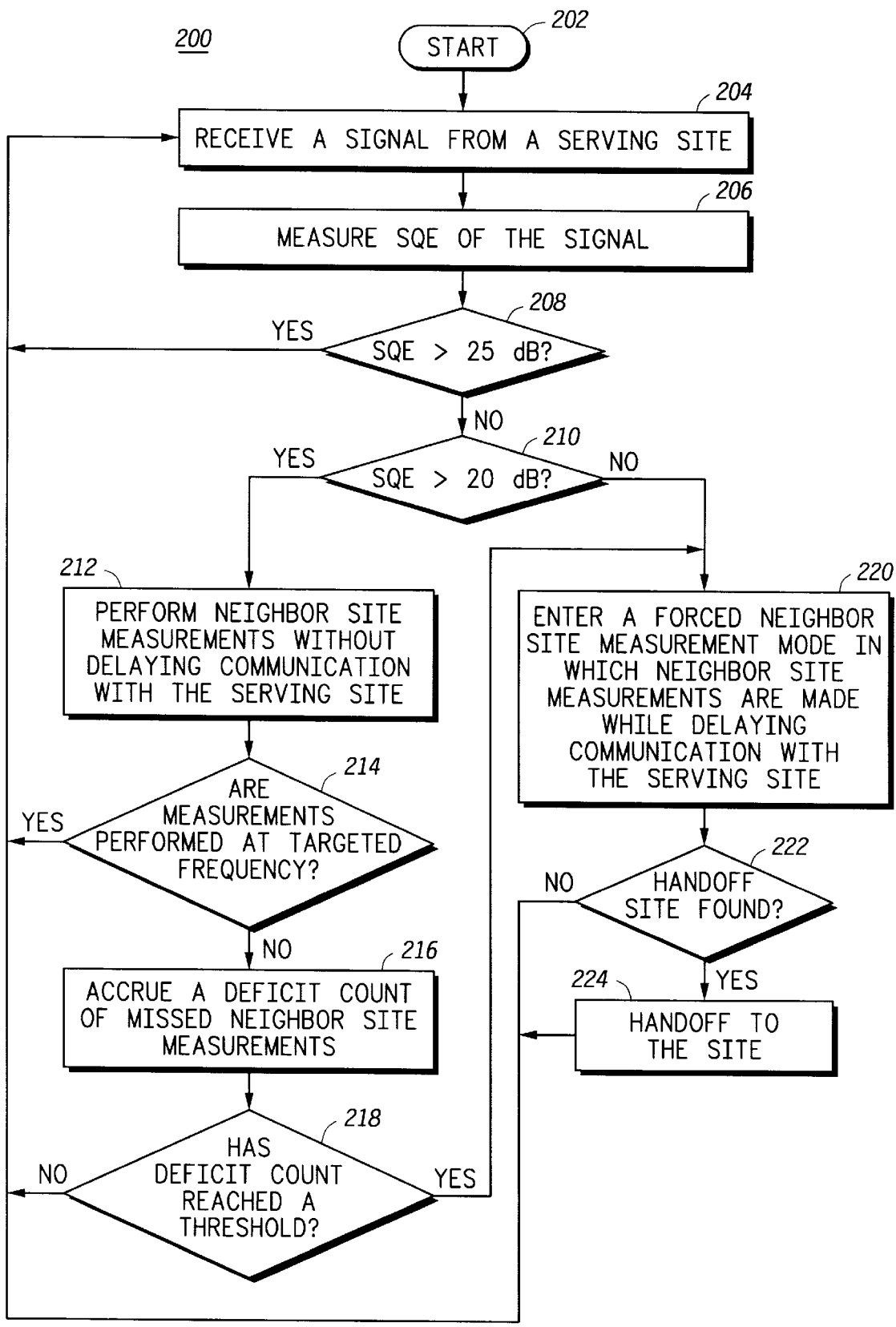
FIG. 2 is a logic flow diagram of steps executed by a communication unit in accordance with the preferred embodiment of the present invention.

The present invention can be more fully understood with reference to FIGS. 1 and 2. FIG. 1 is a block diagram depiction of a communication system 100 in accordance with a preferred embodiment of the present invention. The preferred communication system 100 comprises a communication unit 102 and base sites 108–110. In the preferred embodiment, the communication system 100 comprises an "iDEN" communication system that is commercially available from Motorola, Inc. of Schaumburg, Ill. Accordingly, the communication unit 102 preferably comprises an "iDEN" radiotelephone, and the base sites 108–110 preferably comprise "iDEN" Enhanced Base Transceiver System sites (EBTSs). In practice, the base sites 108–110 are typically coupled to other infrastructure equipment such as controllers and switches. Also in practice, communication system 100 comprises numerous communication units, in addition to communication unit 102, throughout the geographical area covered by numerous base sites in addition to base sites 108–110. It is for the purpose of simplicity that system 100 is illustrated in a limited fashion in FIG. 1.

Operation of the preferred communication system 100, in accordance with the present invention, occurs substantially as follows. The communication unit 102 comprises a receiver 104 and a processor 106. The processor 106 preferably comprises a microprocessor, memory, and a digital signal processor, and the receiver 104 preferably comprises well-known circuitry and software such as that used in amplifiers, demodulators, down converters, and filters. The receiver 104 receives a signal from base site 108. For the purpose of illustration, base site 108 is considered to be the serving site of communication unit 102. As the serving site, base site 108 provides one or more communication services to communication unit 102. Communication unit 102 communicates with base site 108 via a communication resource 112. Base sites 109 and 110 represent neighbor sites to serving site 108. Communication unit 102 preferably performs a neighbor site measurement by receiving one or more signals from base site 109 via communication resource 114, for example, or one or more signals from base site 110 via communication resource 115. Finally, in the preferred embodiment, the communication resources 112, 114, and 115 are time divisioned channels that comprise time slots.

The processor 106 measures the signal quality of the signal received from base site 108. Preferably, the signal quality of the signal comprises a Signal Quality Estimate (SQE) of the signal, although other measurements of signal quality such as received signal strength indication (RSSI) could be used alternatively. Based on the signal quality, or SQE, of the signal, processor 106 determines the neighbor site measurement characteristics of the communication unit 102. In other words, processor 106 uses the signal quality of the serving site to determine how to perform neighbor site measurements. The communication unit 102 then performs neighbor site measurements, using the receiver, according to the neighbor site measurement characteristics determined. Preferably, the processor 106 determines a serving site signal quality by incorporating the signal quality of the signal into a moving average signal quality for the serving site and compares this serving site signal quality to a threshold of about 25 dB. When the signal quality is greater than the threshold, the processor 106 ceases to perform neighbor site measurements; and when the signal quality is not greater than the threshold, the processor 106 performs neighbor site measurements according to the method illustrated in FIG. 2 and described below. Thus, the neighbor site measurement characteristics include how to perform the neighbor site measurements and whether or not to perform the measurements.

In an alternate embodiment, a communication unit attempts to perform neighbor site measurements periodically. Specifically, this alternate communication unit makes a neighbor site measurement after a certain amount of time has elapsed unless communications with a serving site prevent the measurement from being performed. Thus, a particular frequency of neighbor site measurement is established for the communication unit.

The alternate communication unit also measures the signal quality of signals received from the serving site. When the signal quality of a serving site signal is less than the signal quality of an earlier serving site signal, the communication unit increases the frequency of neighbor site measurements. Alternatively, when the signal quality of the serving site signal is greater than the signal quality of the earlier signal, the communication unit decreases the frequency of neighbor site measurement. Thus, as the serving site signal improves in quality, less neighbor site measurements are performed, and as the serving site signal degrades in quality, more neighbor site measurements are performed.

The alternate communication unit may also employ a forced measurement mode. When communications with the serving site prevent neighbor site measurements from being performed at a targeted or desired frequency, the alternate communication unit may enter a forced neighbor site measurement mode. In this forced mode, neighbor site measurements are performed in spite of serving site communication. Thus, neighbor site measurements may delay communications with the serving site. Finally, the communication unit exits the forced mode upon completing a requisite number of neighbor site measurements.

Just as the frequency of neighbor site measurement may be adjusted based on serving site signal quality, so may this requisite number of neighbor site measurements be adjusted. When the signal quality of a serving site signal is less than the signal quality of an earlier serving site signal, the alternate communication unit increases the number of neighbor site measurements required to exit forced measurement mode. Alternatively, when the signal quality of the serving site signal is greater than the signal quality of an earlier signal, the alternate communication unit decreases the number of neighbor site measurements required to exit forced measurement mode. Thus, as the serving site signal improves in quality, less neighbor site measurements are performed while potentially delaying serving site communication. As the serving site signal degrades, however, more neighbor site measurements are performed despite the potential delays to serving site communication.

FIG. 2 is a logic flow diagram 200 of steps executed by a communication unit in accordance with the preferred embodiment of the present invention. The method illustrated in FIG. 2 is performed by a preferred communication unit that obtains communication service from a serving site and is capable of handing off to neighboring sites. The logic flow begins (202) when the communication unit receives (204) a signal from the serving site and measures (206) the signal quality of the signal. In the preferred embodiment, the signal quality of the signal is incorporated into a moving average of signal quality measurements to create a serving site signal quality. The communication unit then determines neighbor site measurement characteristics based on the serving site signal quality. To do this, the preferred communication unit compares (208) the serving site signal quality to a first threshold of about 25 dB. When the serving site signal quality is above the first threshold, a first set of neighbor site measurement characteristics is selected. Preferably, the communication unit, according to the first set of neighbor site measurement characteristics, ceases to perform neighbor site measurements. The logic flow returns, therefore, to step 204 as the communication unit continues to monitor the serving site signal quality without performing neighbor site measurements.

If the serving site signal quality is not above the first threshold, the preferred communication unit compares (210) the serving site signal quality to a second threshold of about 20 dB. When the serving site signal quality is above the second threshold, a second set of neighbor site measurement characteristics is selected. Preferably, the communication unit, according to the second set of neighbor site measurement characteristics, performs (212) neighbor site measurements without delaying communication with the serving site.

Because communication with the serving site takes priority over neighbor site measurements, neighbor site measurements may not be performed at a frequency as high as is desired or targeted. The communication unit, according to the second set of neighbor site measurement characteristics, monitors (214) the frequency at which neighbor site measurements are performed. If communication with the serving site reduces the rate of neighbor site measurements below the targeted frequency, the communication unit accrues (216) a deficit count of missed neighbor site measurements. Otherwise, the logic flow returns to step 204 and the communication unit continues to perform neighbor site measurements based on the serving site signal quality.

The communication unit, according to the second set of neighbor site measurement characteristics, also monitors (218) the number of missed neighbor site measurements accrued. If the deficit count has not reached a preferred threshold of 16, the logic flow returns to step 204 and the communication unit continues to perform neighbor site measurements based on the serving site signal quality. When the deficit count instead reaches the threshold, the communication unit enters (220) a forced neighbor site measurement mode in which one or more neighbor site measurements are made while delaying communication with the serving site. Thus, according to the second set of neighbor site measurement characteristics, communication with the serving site is given priority over neighbor site measurements unless the deficit count reaches a threshold. When this threshold is reached, however, neighbor site measurements are given priority over serving site communication.

Referring again to step 210, if instead the serving site signal quality is not above the second threshold, the communication unit selects a third set of neighbor site measurement characteristics. Preferably, the communication unit, according to the third set of neighbor site measurement characteristics, enters (220) the forced neighbor site measurement mode directly. Thus, due to the low serving site signal quality, neighbor site measurements are given priority over serving site communication. The communication unit performs neighbor site measurements with the purpose of eventually finding a neighbor site to which to handoff. If (222) such a site is found and the decision to handoff is made, as directed by handoff techniques known in the art, the communication unit hands off (224) to the neighbor site. Otherwise, the logic flow returns to step 204 and the communication unit continues to perform neighbor site measurements based on the serving site signal quality.

As described above, the preferred embodiment reduces communication delays between a communication unit and its serving site. By not performing neighbor site measurements when the serving site signal quality is relatively high, communication delays are avoided. As the serving site signal quality begins to degrade, neighbor site measurements are performed but only as serving site communication allows. Finally when either too many signal quality measurements have been missed or when the serving site signal quality degrades significantly, neighbor site measurements are performed in spite of any resulting delays in serving site communication. Communication delays on average are reduced, therefore, by prioritizing neighbor site measurements over serving site communication only when the serving site signal quality indicates that neighbor site measurements are critical.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for performing neighbor site measurements by a communication unit in a communication system, the communication system comprising a serving site that provides communication service to the communication unit and neighbor sites to which the communication unit may handoff, the method comprising:

receiving a signal from the serving site;

measuring a signal quality of the signal;

determining neighbor site measurement characteristics, apart from which particular neighbor sites to measure, based on the signal quality of the signal; and performing neighbor site measurements according to the neighbor site measurement characteristics determined;

receiving an earlier signal from the serving site; and measuring a signal quality of the earlier signal, wherein the step of performing comprises the step of entering a forced neighbor site measurement mode in which at least one neighbor site measurement is made while delaying communication with the serving site.

2. The method of claim 1 wherein the step of determining comprises the step of increasing a frequency of neighbor site measurement when the signal quality of the signal is less than the signal quality of the earlier signal.

3. The method of claim 1 wherein the step of determining comprises the step of decreasing a frequency of neighbor site measurement when the signal quality of the signal is greater than the signal quality of the earlier signal.

4. The method of claim 1 wherein the step of determining comprises the step of increasing the number of neighbor site measurements needed to exit the forced neighbor site measurement mode when the signal quality of the signal is less than the signal quality of the earlier signal.

5. The method of claim 1 wherein the step of determining comprises the step of decreasing the number of neighbor site measurements needed to exit the forced neighbor site measurement mode when the signal quality of the signal is greater than the signal quality of the earlier signal.

6. The method of claim 1 wherein the signal quality of the signal comprises a Signal Quality Estimate (SQE) of the signal.

7. The method of claim 1 further comprising the step of handing off to a neighbor site.

8. A method for performing neighbor site measurements by a communication unit in a communication system, the communication system comprising a serving site that provides communication service to the communication unit and neighbor sites to which the communication unit may handoff, the method comprising:

receiving a signal from the serving site;

measuring a signal quality of the signal;

determining neighbor site measurement characteristics, apart from which particular neighbor sites to measure, based on the signal quality of the signal; and performing neighbor site measurements according to the neighbor site measurement characteristics determined, wherein the step of determining comprises the step of determining a serving site signal quality using the signal quality of the signal, and wherein the step of determining the serving site signal quality comprises the step of selecting a first set of neighbor site measurement characteristics when the serving site signal quality is above a first threshold.

9. The method of claim 8 wherein the step of determining further comprises the step of selecting a second set of neighbor site measurement characteristics when the serving site signal quality is above a second threshold but not above the first threshold.

10. The method of claim 9 wherein the step of determining further comprises the step of selecting a third set of neighbor site measurement characteristics when the serving site signal quality is not above a second threshold.

11. The method of claim 10 wherein the first set of neighbor site measurement characteristics comprises the step of performing neighbor site measurements without delaying communication with the serving site.

12. The method of claim 10 wherein the second set of neighbor site measurement characteristics comprises the steps of:

performing neighbor site measurements without delaying communication with the serving site;

when communication with the serving site reduces the rate of neighbor site measurements below a targeted frequency, accruing a deficit count of missed neighbor site measurements; and when the deficit count reaches a threshold, entering a forced neighbor site measurement mode in which at least one neighbor site measurement is made while delaying communication with the serving site.

13. The method of claim 10 wherein the first threshold is about 25 dB, and wherein the second threshold is about 20 dB.

14. The method of claim 10 wherein the third set of neighbor site measurement characteristics comprises the step of entering a forced neighbor site measurement mode in which at least one neighbor site measurement is made while delaying communication with the serving site.

15. The method of claim 8 wherein the step of determining further comprises the step of ceasing to perform neighbor site measurements when the serving site signal quality is above a second threshold and above the first threshold.

16. The method of claim 8 wherein the step of determining a serving site signal quality comprises the step of incorporating the signal quality of the signal into a moving average signal quality for the serving site.

17. A communication unit comprising:

a receiver capable of receiving a signal and an earlier signal from a serving site; and a processor, coupled to the receiver, capable of measuring a signal quality of the signal and the earlier signal, determining neighbor site measurement characteristics, apart from which particular neighbor sites to measure, based on the signal quality of the signal, and performing neighbor site measurements, using the receiver, according to the neighbor site measurement characteristics determined, wherein performing neighbor site measurements comprises entering a forced neighbor site measurement mode in which at least one neighbor site measurement is made while delaying communication with the serving site.

* * * * *